United States Patent
Kullman et al.

[11] Patent Number: 5,860,496
[45] Date of Patent: Jan. 19, 1999

[54] PIN GUIDED PUSH-PULL CALIPER

[75] Inventors: Bernard Kullman, Rochester Hills; Stefan Anger, Oxford; Jorg Scheibel, Oakland, all of Mich.

[73] Assignee: ITT Automotive Inc., Auburn Hills, Mich.

[21] Appl. No.: 769,624

[22] Filed: Dec. 18, 1996

[51] Int. Cl.$^6$ .................................................. F16D 65/02
[52] U.S. Cl. ..................... 188/73.45; 188/73.37
[58] Field of Search ............................ 188/73.31, 73.35, 188/73.36, 73.37, 73.45

[56] References Cited

U.S. PATENT DOCUMENTS

| | | |
|---|---|---|
| 3,862,674 | 1/1975 | Vananrooy et al. . |
| 3,882,972 | 5/1975 | Newstead et al. . |
| 4,093,043 | 6/1978 | Smith . |
| 4,109,766 | 8/1978 | Inoue et al. . |
| 4,373,615 | 2/1983 | Melinat ................................... 188/73.1 |
| 4,465,163 | 8/1984 | Matsumoto . |
| 4,754,856 | 7/1988 | Villata . |
| 4,887,696 | 12/1989 | Redenbarger et al. ............... 188/73.45 |
| 5,257,679 | 11/1993 | Weiler et al. . |
| 5,657,837 | 8/1997 | Yamadera et al. .................... 188/73.45 |

*Primary Examiner*—Robert J. Oberleitner
*Assistant Examiner*—Tyrone M. Lee
*Attorney, Agent, or Firm*—J. Gordon Lewis; Thomas N. Twomey

[57] ABSTRACT

A disc brake for a motor vehicle includes a rotor mounted to a wheel and rotatable about a first axis therewith; a pair of parallel-spaced pins removably mounted to the vehicle chassis so as to extend in a direction generally parallel to the first axis; a pair of brake shoes having slots for receiving the pins on either side of the rotor so as to place brake linings respectively mounted on the pins in opposition with complementary annular friction surfaces on either side of the rotor; and a caliper slidably supported by the two pins so as to straddle the rotor and both brake shoes, respectively. The slots of the brake shoes are defined in part by a finger configured to deflect responsive to a brake load and the deflection of the finger enables the sequential engagement of the brake shoes against the pins.

7 Claims, 3 Drawing Sheets

PIN GUIDED PUSH-PULL CALIPER

TECHNICAL FIELD

The present invention relates to pin-mounted sliding caliper disc brakes used to apply braking torque to a wheel of a motor vehicle. More specifically, the invention relates to sliding caliper disc brakes of the "push-pull" type, i.e., wherein each brake shoe is itself supported at each of its respective longitudinal ends on parallel pins extending from a chassis component, such as a knuckle or an axle flange, enabling the transfer of brake torque to the vehicle chassis through each of the pins.

BACKGROUND OF THE INVENTION

The prior art teaches disc brakes for motor vehicles generally comprising a circular disc or rotor mounted to a wheel for rotation about a common axis. An anchor member, rigidly mounted to the axle which supports the wheel, also provides a rigid support for a caliper which otherwise straddles a portion of the periphery of the rotor. The caliper itself supports a pair of brake shoes with brake linings on either side of the rotor. A piston housed within the caliper on one side of the rotor is operative to urge one brake shoe lining into engagement with one side of the rotor, whereupon the piston further operates to slidably shift the caliper away from the rotor to thereby bring the other brake shoe lining into engagement with the other side of the rotor and, hence, generate the desired braking torque.

In one alternative arrangement taught by the prior art, the brake shoes are themselves supported by a pair of pins which extend from the caliper in a direction generally parallel to the rotational axis of the wheel/rotor. Under this prior art design, the shoes are designed so that only one pin bears the braking torque as the brake shoe linings are respectively urged into engagement with the rotor while the other pin serves merely to maintain the relative positions of each brake shoe.

What is needed, then, is an improved sliding caliper disc brake for applying braking torque to a wheel of a motor vehicle featuring reduced part count and ease of replacement/repair of its brake shoes and linings, while otherwise minimizing shifting and vibration of the installed brake shoes during vehicle braking and, correlatively, reducing any uneven brake wear or deterioration in brake performance likely to result therefrom.

SUMMARY OF THE INVENTION

Under the present invention, a disc brake for applying a braking torque to a wheel of a motor vehicle comprises a rotor mounted to the wheel and rotatable therewith about a first axis, and a pair of parallel-spaced pins removably mounted on a stationary fixed member of the vehicle chassis proximate to the rotor's outer edge so as to extend in the direction of the first axis. The disc brake also includes a first and second brake shoe slidably supported by the pins on either side of the rotor, respectively, so as to place each shoe's brake lining in opposition with a respective annular friction surface located on opposite sides of the rotor. The disc brake further includes a caliper slidably supported by the pins so as to straddle the rotor and brake shoes, with the caliper including means, such as a hydraulically-operated piston, operating in the direction of the rotational axis of the wheel and rotor, for urging each shoe and, hence, each brake lining thereon into engagement with the rotor's respective friction surfaces.

Significantly, under the present invention, the brake shoes are provided with a novel, preferably three-sided slot within which to receive and otherwise transfer braking torque from each brake shoe to each supporting pin. More specifically, in a preferred embodiment featuring generally cylindrical pins of like nominal diameter, and using as a reference a plane intersecting the respective longitudinal axis of each pin, the two slots of each brake shoe are individually characterized by three generally planar wall portions separated from one another by arcuate wall portions.

In accordance with another feature of the present invention, the use of common pins upon which to slidably support both the brake shoes and the caliper further reduces the number of parts employed under the present invention, for example, by eliminating the need for a second pair of pins on the stationary member.

DETAILED DESCRIPTION OF THE PREFERRED EMBODIMENT(S)

Figure 1:
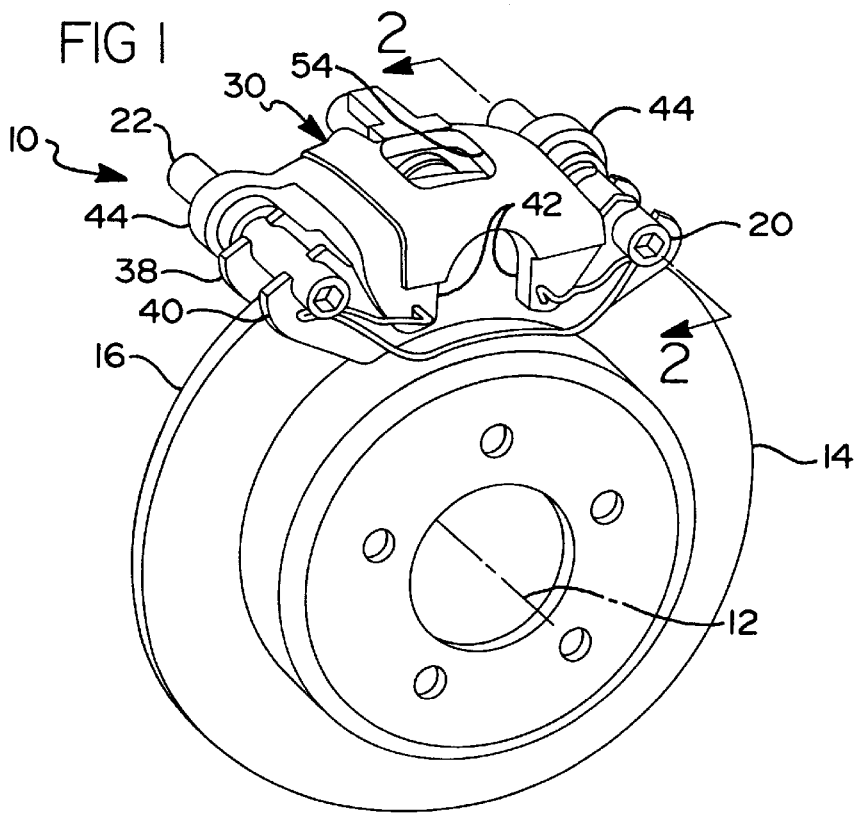
FIG. 1 is a perspective view of an exemplary caliper-type disc brake in accordance with the present invention.
Figure 2:
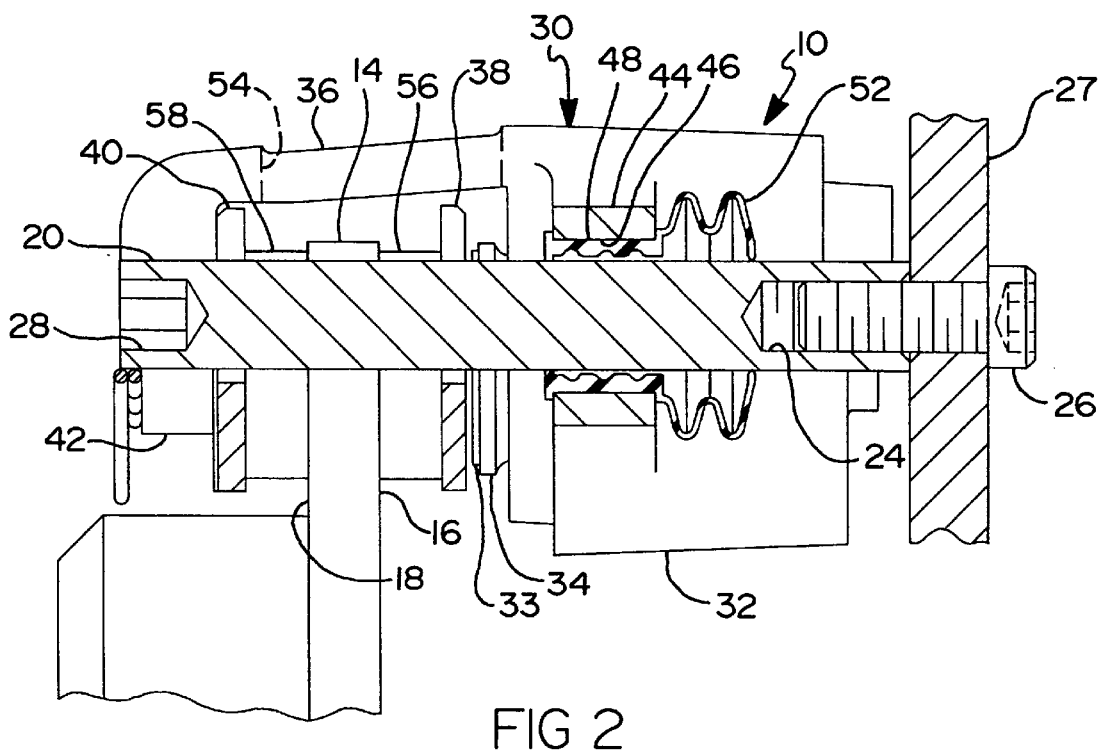
FIG. 2 is a partial view in cross-section of the disc brake of FIG. 1 along line 2—2 thereof.
Figure 3:
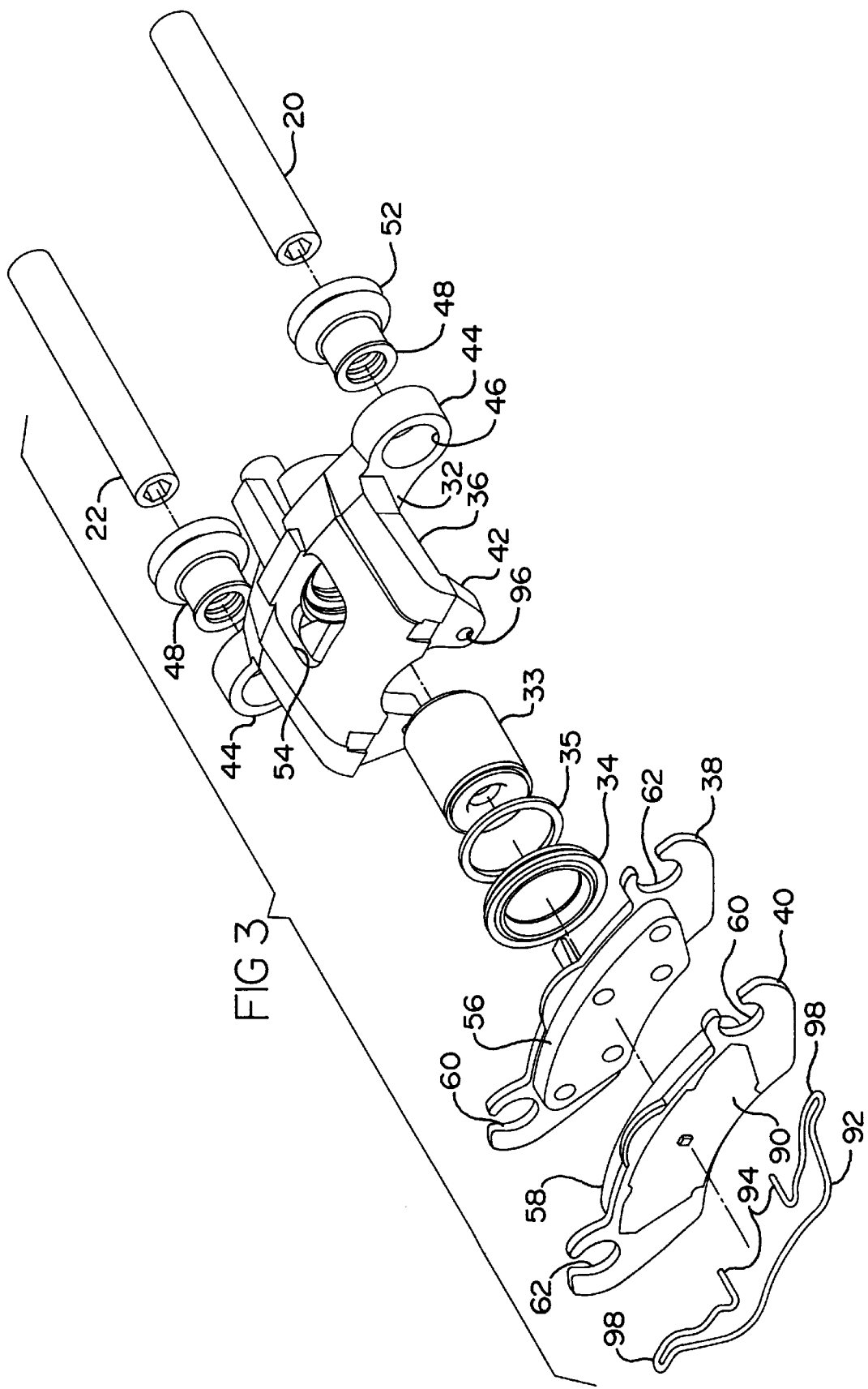
FIG. 3 is an exploded view in perspective of the disc brake of FIG. 1 (with the rotor having been removed for clarity)

Referring to FIG. 1, an exemplary sliding caliper disc brake 10 for applying a braking torque to the wheel (not shown) of a motor vehicle rotating about a first axis 12 includes a rotor 14 mounted to the wheel proximate to the wheel's hub. As seen in FIG. 2, the rotor 14 has a first inboard side defining an inboard annular friction surface 16 and a second, outboard side defining an outboard annular friction surface 18.

A pair of hardened pins 20 and 22 are removably mounted on a stationary fixed member of the vehicle chassis, such as the wheel's knuckle 27 as through engagement of a threaded longitudinal bore 24 in one end of each pin with a complementary male threaded fastener 26 extending from the knuckle 27. The other end of each pin preferably has formed therein, for example, a socket 28 within which to accept a suitable driving tool. Thus mounted, each pin 20, 22 extends in a direction generally parallel to the rotational axis 12 of the wheel and rotor 14, and parallel to each other. The pins 20, 22 are of a first diameter for substantially their entire length.

A caliper, indicated generally at 30, is slidably supported by the pins 20,22 to permit relative movement of the caliper 30 in the direction of the first axis 12, i.e., in a direction generally transverse relative to the rotational plane of the rotor 14. More specifically, the caliper 30 includes: a radially-inward, inboard portion 32 housing a hydraulic piston 33 having a protective dust boot 34 and seal 35; a radially-outer bridge portion 36 which straddles both a radially-outer edge of the rotor and identical inboard and outboard brake shoes 38 and 40; and a radially-inward outward portion 42 with a finger area. The inboard portion 32 of the caliper 30 includes diametrical transverse flanges 44, each having a cylindrical bore 46 parallel to axis 12. An annular rubber bushing 48 is disposed in each bore 46. An inner diameter of bushings 48 is sized to slidably receive each pin 20, 22. A longitudinal extension of each bushing defines a dust boot 52. As seen in FIG. 1, a central aperture 54 may be formed in the caliper's bridge 36 to reduce the weight thereof while further accommodating the internal contours of the wheel's inner rim (not shown).

The brake shoes 38 are slidably supported by the pins 20, 22, one shoe in opposition with each side of the rotor 14. Each brake shoe 38, 40 has a brake lining or pad 56 and 58 respectively secured thereto suitable for repeated engagement with annular friction surfaces 16, 18, respectively.

Figure 4:
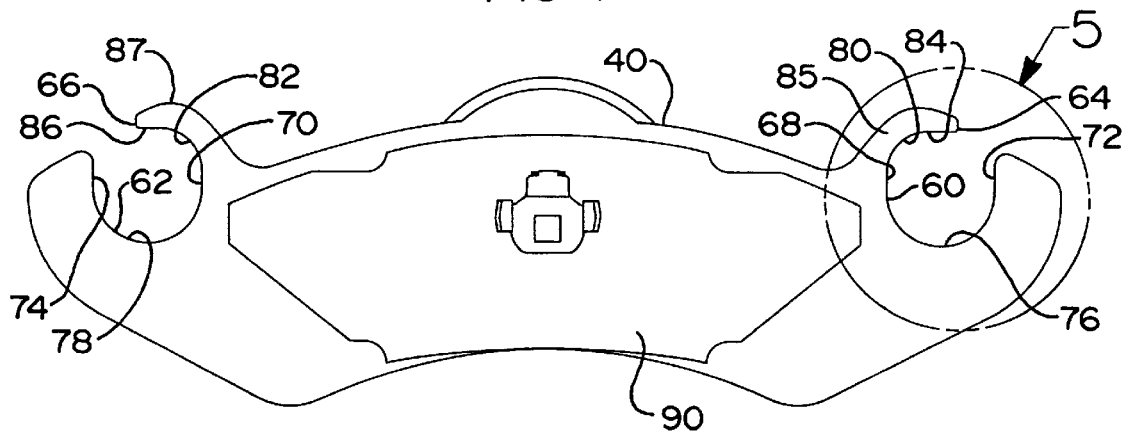
FIG. 4 is an elevational view of one of the brake shoes employed by the disc brake of FIG. 1.
Figure 5:
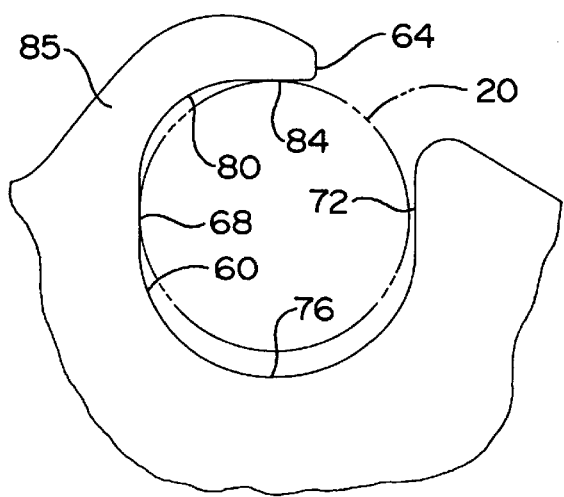
FIG. 5 is an enlarged partial view of one longitudinal end of the brake shoe of FIG. 4 within circle 5 thereof.

Each of brake shoes 38 and 40 are symmetric about a vertical line with mirror-image first and second pin slots 60 and 62 as best shown in FIG. 4. Each of slots 60 and 62 are characterized by an outboard arcuate gap 64 and 66 respectively of much less than 180°. Both slots 60 and 62 have three sides or planar wall portions separated from one another by arcuate wall portions. First sides 68 and 70 of slots 60 and 62 respectively are inboard sides. Second sides 72 and 74 of slots 60 and 62 respectively are located outboard of and parallel to sides 68 and 70, and extend upward to gaps 64 and 66 respectively. First arcuate wall portions 76 and 78, connect first sides 68 and 70 with second sides 72 and 74 respectively on the lower ends of slots 60 and 62. Second arcuate wall portions 80 and 82 connect first sides 68 and 70 with third sides 84 and 86 respectively. Third sides 84 and 86 extend to gaps 64 and 66. Elastically deflecting fingers 85 and 87 define sides 84 and 86, as well as second arcuate wall portions 80, 82. The distance across slots 60 and 62 between the first sides 68 and 70 and the second sides 72 and 74 is approximately equal to the diameter of pins 20, 22, allowing only a very limited amount of fore-aft movement of brake shoes 38, 40 relative to pins 20, 22. The distance between third sides 84, 86 and an apex of first arcuate wall portions 76 and 78 is appreciably greater than the diameter of pins 20, 22, accommodating a somewhat greater amount of up and down movement of shoes 38, 40 relative to pins 20, 22. The distance between slots 60 and 62 is such that the distance between first side 68 and second side 74 is slightly greater than a distance between the centers of pins 20 and 22, and therefore greater than the distance between the point on pin 20 contacting side 68, and the point on pin 22 closest to side 74. Similarly, the distance between sides 70 and 72 is less than the distance between the centers of pins 20 and 22.

A patch of anti-rattle material 90 is disposed on an outboard side of both brake shoes 38, 40. A housing spring 92 has tips 94 disposed in apertures 96 of caliper outboard portion 42. Elbows 98 of spring 92 engage outboard shoe 40, aiding in the retention of shoes 38, 40 during shipping of the brake assembly 10. Engagement of elbows 98 against outboard shoe 40 also reduces rattle of outboard brake shoe 40 when the caliper assembly 10 is mounted in a vehicle.

As with other sliding caliper disc brakes, in operation, the piston 33 housed in the inboard portion 32 of the caliper 30 is operated under hydraulic pressure to first urge the inboard shoe 38 along the piston's centerline (generally parallel to the first axis about which the wheel and rotor rotates) and pad 56 into engagement with the rotor's inboard friction surface 16. Once the inboard pad 56 has engaged the rotor's inboard friction surface 16, the piston's continuing effort will be in part exerted back upon the inboard portion 32 of the caliper 30. The caliper 30 will thus be urged to the right as shown in FIG. 2 and, in turn, will operate through bridge 36 and finger area of outboard portion 42 to urge the outboard pad 58 into engagement with the rotor's outboard friction surface 18. It should be appreciated that other actuating mechanisms, such as a motor driven screw, may be used in place of the hydraulically actuated piston.

For purposes of discussion, the brake rotor 14 of FIG. 1 will be assumed to be rotating in the clockwise direction. In accordance with the present invention, the brake torque generated upon engagement of each brake pad with its respective rotor friction surface is transferred to both pins in the following manner.

Pin 20 is acted upon by first side 68 of outboard shoe 40 and first side 70 of inboard shoe 38. The brake pad friction force causes fingers 85 and 87 to elastically deflect, producing engagement between pin 22 and second sides 72, 74 of shoes 38 and 40 respectively as well as between pin 20 and sides 68 and 70. Hence, the desired push-pull brake shoe engagement results, with shoes 38 and 40 pushing against leading pin 20 and pulling on the trailing pin 22. The slots 60 and 62 are advantageously located relative to one another in that the first side of the leading slot is engaged by the associated pin. Initial engagement of the first side of the leading slot provides a stable brake engagement, minimizing uneven pad wear and engagement noise. By "leading pin" it is meant that the pin is associated with the end of the brakes shoe that, given a particular direction of rotor rotation, leads the rest of the shoe. In FIG. 1, for clockwise rotation, pin 20 is the leading pin and pin 22 is the trailing pin. For counter clockwise rotation, pin 22 is the leading pin and pin 20 is the trailing pin.

If the direction of rotor rotation is counterclockwise instead of clockwise, the engagement pattern being essentially the converse of that described above. First side 70 of second slot 62 and first side 68 of first slot 60 of shoes 40 and 38 respectively initially engage pin 22. Deflection of the associated fingers results in engagement of second sides 72 and 70 with pin 20.

By having the shoes first engage the leading pin, and then deflecting to engage the trailing pin to achieve push-pull engagement, the invention reduces the vibration often associated with prior art push-only or pull-only disc brake system by relatively evenly distributing the braking load transferred to the rotor between the two pins.

While the preferred embodiments of the invention have been disclosed, it should be appreciated that the invention is susceptible of modification without departing from the spirit of the invention or the scope of the subjoined claims.

We claim:

1. A disc brake for applying a braking torque to a wheel of a motor vehicle, the wheel being rotatable about a first axis, said disc brake comprising:

a rotor mounted to the wheel and rotatable about the first axis therewith, said rotor having a first side and a second side, wherein the first side defines a first annular friction surface and the second side defines a second annular friction surface;

a pair of parallel-spaced pins removably mounted on a rigid structural element of the vehicle proximate to an outer edge of the rotor so as to extend generally in the direction of the first axis;

first and second brake shoes having a pair of slots with one slot proximate to each end of the brake shoes, the slots slidably receiving said pins on either side of said rotor, respectively, so as to place a first brake pad on said first brake shoe in opposition with a portion of the first friction surface of said rotor and a second brake pad on said second brake shoe in opposition with a portion of the second friction surface of said rotor and the slots being spaced and sized so that the shoes will sequentially engage a first of the pins and a second of the pins;

a caliper slidably supported by said pins so as to straddle said rotor and said brake shoes, respectively, said caliper including means, operative along a second axis substantially parallel with said first axis, for urging said first and second brake pads into engagement with the first and second friction surfaces of said rotor, respectively wherein said slots are defined in part by a finger configures to deflect responsive to a braking load and the deflection of the finger enabling the sequential engagement of the pins, and the finger defines an arcuate gap of significantly less than 180°.

2. The disc brake of claim 1, wherein said pins are of a constant diameter for substantially their entire length and a distance between the slots and a size of the slot ensures contact between the shoes and a leading pin before contact between the shoes and a trailing pin.

3. The disc brake of claim 2, wherein said slots have two substantially parallel flat sides oriented substantially perpendicular to the direction of rotation.

4. A disc brake comprising:

a rotor rotatable about a first axis and defining first and second opposed annular friction surfaces and an outer edge;

a pair of pins extending generally in the direction of the first axis past the outer edge of said rotor, each of said pins being of generally cylindrical cross-section along a portion thereof proximate said rotor's outer edge;

first and second brake shoes on either side of said rotor, each of said brake shoes having a brake pad thereon in opposition with a respective annular friction surface of said rotor each of said brake shoes having a first slot and a second slot proximate to ends of the shoes slidably receiving the pins for support of the shoes thereon and the slots having an arcuate gap significantly less than 180° defined by an elastic finger on an inboard side of the slots with the slots being spaced and sized so that contact between the elastic fingers of the shoes and a leading pin occurs before contact between the shoes and a trailing pin; and a caliper slidably supported by the pins so as to straddle said rotor and said brake shoes, respectively, said caliper including a brake apply mechanism oriented substantially parallel to the first axis and operably urging the brake pad of each of said brake shoes into engagement with the respective opposed friction surfaces of said rotor, wherein brake actuation by said brake apply mechanism results in a deflection of the fingers engaging the leading pins resulting in an engagement between the brake shoes and the trailing pin with a transfer of braking load through both the leading pins and trailing pin.

5. The disc brake of claim 4, wherein said slots have two substantially parallel flat sides oriented substantially perpendicular to the direction of rotation.

6. The disc brake of claim 4, wherein said slots are defined in part by a finger configured to deflect responsive to a braking load and the deflection of the finger enables the sequential engagement of the pins, and the finger defines an arcuate gap of significantly less than 180°.

7. A brake shoes assembly for use with disc brakes comprising:

an elongate body having a float frictional brake pad thereon and having first slot sized to receive a pin of a predetermined size and having a second slot essentially a mirror image of the first slot, the first slot having an arcuate gap of substantially less than 180° defined in part by a finger disposed on an inboard side of the first slot and the finger configured and oriented to deflect responsive to engagement with the pin when subjected to a brake load apply.

* * * * *